United States Patent
Bauer et al.

(10) Patent No.: US 7,398,649 B2
(45) Date of Patent: Jul. 15, 2008

(54) SYSTEM AND METHOD FOR INFLUENCING THE INDUCTION GAS TEMPERATURE IN THE COMBUSTION CHAMBER OF AN INTERNAL COMBUSTION ENGINE

(75) Inventors: Erwin Bauer, Lappersdorf (DE); Dietmar Ellmer, Regensburg (DE); Thorsten Lauer, Holzheim a. Forst (DE)

(73) Assignee: Siemens Aktiengesellschaft, Munich (DE)

( * ) Notice: Subject to any disclaimer, the term of this patent is extended or adjusted under 35 U.S.C. 154(b) by 202 days.

(21) Appl. No.: 10/554,160

(22) PCT Filed: Mar. 15, 2004

(86) PCT No.: PCT/EP2004/002670

§ 371 (c)(1),
(2), (4) Date: Oct. 21, 2005

(87) PCT Pub. No.: WO2004/097199

PCT Pub. Date: Nov. 11, 2004

(65) Prior Publication Data

US 2006/0218922 A1 Oct. 5, 2006

(30) Foreign Application Priority Data

Apr. 29, 2003 (DE) ................. 103 19 330

(51) Int. Cl.
*F02B 33/44* (2006.01)
*F02M 25/07* (2006.01)
*G01M 15/00* (2006.01)

(52) U.S. Cl. ............ 60/605.2; 123/568.12; 123/568.21; 701/108; 73/118.1; 73/118.2

(58) Field of Classification Search ................. 60/605.2, 60/599; 123/568.12, 568.21; 701/102, 108; 73/118.1, 118.2
See application file for complete search history.

(56) References Cited

U.S. PATENT DOCUMENTS 2,633,698 A 4/1953 Nettel ......................... 60/599

(Continued)

FOREIGN PATENT DOCUMENTS

AT 005 646 U1 9/2002

(Continued)

OTHER PUBLICATIONS

Von Karl-Heinrich Lösing and Rainer Lutz, "Einhaltung zukünftiger Emissionzvorschriften durch gekühlte Abgasrückführung", MTZ Motortechnische Zeitschrift 60, 1999, pp. 470-475; 7/8.

(Continued)

*Primary Examiner*—Thai-Ba Trieu

(57) ABSTRACT

The invention relates to a system and method for use in a homogeneous charge compression ignition (HCCI) combustion engine that is preferably equipped with an exhaust gas recirculation device. This system and method enable an improved adjustment of the temperature level inside the combustion chamber. In addition to adjusting the temperature by using the exhaust gas recirculation device, an influencing of the temperature, which is independent thereof, ensues based on the compression of the induced fresh air by the exhaust gas turbocharger. An increase in temperature is maintained even after the compressed air is expanded on a throttle valve, and this increase in temperature can, in the end, be used for influencing the energy content inside the combustion chamber.

19 Claims, 3 Drawing Sheets

U.S. PATENT DOCUMENTS

| | | | |
|---|---|---|---|
| 4,078,387 A | 3/1978 | Melchior et al. | |
| 4,452,044 A | 6/1984 | Iwamoto et al. | |
| 4,485,625 A * | 12/1984 | Fujimoto et al. | 60/605.2 |
| 5,205,260 A * | 4/1993 | Takahashi et al. | 73/118.2 |
| 5,273,019 A * | 12/1993 | Matthews et al. | 123/568.21 |
| 5,941,927 A * | 8/1999 | Pfitz | 73/118.2 |
| 5,974,870 A * | 11/1999 | Treinies et al. | 73/118.2 |
| 6,352,065 B1 * | 3/2002 | Wild et al. | 123/568.21 |
| 6,415,148 B1 | 7/2002 | Chiniga et al. | |
| 6,543,411 B2 | 4/2003 | Raab et al. | 123/568.14 |
| 6,588,261 B1 * | 7/2003 | Wild et al. | 73/118.2 |
| 6,651,492 B2 * | 11/2003 | Kolmanovsky et al. | 73/118.2 |
| 6,718,942 B2 * | 4/2004 | Burgio et al. | 701/108 |
| 6,826,903 B2 * | 12/2004 | Yahata et al. | 123/568.12 |
| 6,866,030 B1 * | 3/2005 | Sun et al. | 60/605.2 |
| 6,952,640 B2 * | 10/2005 | Bleile et al. | 701/108 |
| 6,959,254 B2 * | 10/2005 | Reuschenbach et al. | 123/568.21 |
| 6,964,256 B2 * | 11/2005 | Kataoka et al. | 123/568.21 |
| 6,980,902 B2 * | 12/2005 | Nakazawa | 701/102 |
| 7,127,892 B2 * | 10/2006 | Akins et al. | 60/605.2 |
| 7,174,713 B2 * | 2/2007 | Nitzke et al. | 60/605.2 |
| 7,174,777 B2 * | 2/2007 | Fischer et al. | 73/118.1 |
| 7,225,793 B2 * | 6/2007 | Schwulst et al. | 73/118.2 |
| 2005/0211233 A1 * | 9/2005 | Moulin et al. | 123/673 |
| 2007/0068159 A1 * | 3/2007 | Ueno et al. | 60/605.2 |
| 2007/0079607 A1 * | 4/2007 | Suzuki et al. | 60/299 |
| 2007/0119172 A1 * | 5/2007 | Barbe et al. | 60/605.2 |

FOREIGN PATENT DOCUMENTS

| | | |
|---|---|---|
| DE | 36 27 312 A1 | 2/1987 |
| DE | 39 09 932 A1 | 9/1990 |
| DE | 42 40 239 C2 | 6/1994 |
| DE | 197 06 859 A1 | 9/1998 |
| DE | 100 02 482 A1 | 7/2001 |
| DE | 100 09 180 C2 | 9/2001 |
| EP | 0 914 014 A1 | 5/1999 |
| EP | 1 220 560 A2 | 7/2002 |
| WO | WO 99/42718 | 8/1999 |
| WO | WO 01/58190 A1 | 8/2001 |

OTHER PUBLICATIONS

Wolfgang W. Gnadt, "Turbomotoren—Eine Einführung in die technischen Grundlagen der Auflagung", Bartsch Verlag Kommanditgesellschaft, München, Oct. 1984, p. 50.

* cited by examiner

SYSTEM AND METHOD FOR INFLUENCING THE INDUCTION GAS TEMPERATURE IN THE COMBUSTION CHAMBER OF AN INTERNAL COMBUSTION ENGINE

CROSS REFERENCE TO RELATED APPLICATION

This application is the US National Stage of International Application No. PCT/EP2004/002670, filed Mar. 15, 2004 and claims the benefit thereof. The International Application claims the benefits of German Patent applications No. 10319330.8 DE filed Apr. 29, 2003, all of the applications are incorporated by reference herein in their entirety.

FIELD OF THE INVENTION

The invention relates to a system for influencing the induction gas temperature and thereby the energy level in the combustion chamber of an internal combustion engine, especially of an HCCI-enabled internal combustion engine with a compression device for compressing induced fresh air, which before compression has a temperature $T_1$, as well as expansion means which cause the compressed induced fresh air to expand, with the compressed and subsequently expanded fresh air having a temperature $T_2 > T_1$.

The invention further relates to a method for influencing the induction gas temperature and thereby the energy level in the combustion chamber of an internal combustion engine, especially of a HCCI-enabled internal combustion engine, in which induced fresh air, which before the compression has a temperature $T_1$, is compressed, and the compressed, induced fresh air is expanded, where the compressed and subsequently expanded fresh air has a temperature $T_2 > T_1$.

BACKGROUND OF THE INVENTION

Different operating conditions are known in conjunction with direct petrol injection systems. The common factor is that fuel is injected under high pressure directly into a combustion chamber. The mixture is then formed within the combustion chamber. Conventionally a distinction is made between the homogeneous and lean operating modes. In homogenous operation a mixture is present which is distributed homogeneously over the entire combustion chamber. In stratified or lean injection operation there is only a mixture with a excess air in factor the area of the spark plug $\lambda \leq 1$. The remaining volume of the combustion chamber is filled with induced fresh air, an inert gas from the exhaust gas recirculation or a very lean fuel-air mixture, so that overall an excess air factor of $\lambda \leq 1$ is produced.

In addition to these conventional operating modes, a further operating mode is increasingly being seen as promising, which is similar to the operation of the self-ignition diesel engine. This is known as HCCI (Homogeneous Charge Compression Ignition) operation and represents an auto-ignition combustion process, in which the time of ignition and thereby the sequence of combustion is controlled via the reactive quantity of energy in the cylinder. To provide a sufficient energy level use is usually made of exhaust gas recirculation via external setting means within the framework of exhaust gas recirculation or by a suitable gas exchange valve control within the framework of an internal exhaust gas recirculation.

For setting of the temperature level and thereby the energy level in the combustion chamber via the exhaust gas recirculation rate however it is necessary to take into account that this can only take place within specific limits. Since the exhaust gas recirculation rate influences not only the temperature level in the combustion chamber but also the mixture ratio of air, fuel and exhaust gas, it is under some circumstances not possible to select an exhaust gas recirculation rate which is optimum both with regard to the temperature in the combustion chamber and with regard to the said air-fuel mixture ratio. Thus compromises can be necessary when setting the exhaust gas recirculation rate to ensure reliable operation of the internal combustion engine.

In the context of conventionally ignited internal combustion engines it has already been proposed that a cooled exhaust gas recirculation be used, whereby this cooling of the exhaust gas is aimed especially at reducing the nitric oxide emissions. In this context reference is made for example to the German periodical MTZ Motortechnische Zeitschrift 60 (1999) 7/8, page 470 ff.: "Einhaltung zukünftiger Emissionsvorschriften durch gekühlte Abgasrückführung" (complying with future emission regulations using cooled exhaust gas recirculation) by Karl-Heinrich Losing and Rainer Lutz.

SUMMARY OF THE INVENTION

The object of the invention is to overcome the disadvantages of the prior art and especially to provide a system and a method through which setting the temperature in the combustion chamber of the internal combustion engine can be decoupled at least partly from the setting of the optimum mixture ratio of air, fuel and exhaust gas.

This object is achieved with the features of the independent claims.

Advantageous embodiments of the invention are specified in the dependent claims.

The invention builds on the generic system in that the temperature increase of the fresh air from $T_1$ to $T_2$ is explicitly used to influence the temperature level and thereby the energy level in the combustion chamber. In this way very fine variations and settings of the energy level in the combustion chamber can be achieved by increasing the temperature or by regulating the air/fuel temperature. In this way the combustion process in the HCCI mode can be precisely controlled. The temperature level in the combustion chamber can in this case be influenced via the level of compression and the subsequent expansion.

The inventive system is developed in a particularly useful way in that an exhaust gas recirculation device to feed in exhaust gas from a previous combustion cycle to fresh air or to a mixture featuring fresh air is provided so as to supply, after the injection of fuel, an air/fuel/exhaust gas mixture with an energy level advantageous for combustion. As well as influencing the temperature level through compression and expansion the exhaust gas recirculation and in this case especially the exhaust gas recirculation rate can also be explicitly used to adjust the energy level in the combustion chamber.

The inventive system can then be used to particularly good effect if the compression device is an exhaust gas turbocharger. This is a frequently used device for increasing the gas density in the induction system, so that in the combustion chamber an increased volume or air can be provided which results in an increase in performance of the internal combustion engine. The compression device is driven by a turbine located in the exhaust gas stream.

The system can also be used to good effect when the compression device is a compressor. This is also used to compress the gas pressure in the induction system, with the drive energy being supplied mechanically by the internal combustion engine. As an alternative the compressor can also be driven by means of electrical energy.

There is useful provision for the compression to be undertaken on a throttle valve. With direct injection systems the throttle valve is used for dosed feeding of fresh air, with the throttle effect causing a reduction in pressure. Finally the air compressed in the exhaust gas turbocharger or the compressor and expanded on the throttle valve has, in accordance with the basic laws of thermodynamics, a higher temperature than the originally induced fresh air.

The invention is developed in a particularly advantageous way in that a temperature sensor to record the temperature $T_2$ in the direction of flow of the fresh gas is disposed downstream from the expansion means so that this can be taken into account within the framework of a regulation of the induction gas temperature. The temperature of the fresh air downstream from the throttle valve is thus an important input variable in finally advantageously defining the energy level in the combustion chamber for the HCCI operating mode.

In conjunction with a system equipped with exhaust gas recirculation it proves to be especially useful for at least one heat exchanger operating as an exhaust gas cooler for lowering the temperature of the recirculated exhaust gas to be provided and for a cooling means setting valve to be provided so that by influencing the cooling means throughflow through the exhaust gas cooler, taking into account measured values or values determined from a technical model, the induction gas temperature can be set or regulated respectively. The recirculated exhaust gas volume is thus no longer compulsorily coupled to the temperature increase in the combustion chamber achieved by exhaust gas recirculation. Instead the energy content in the combustion chamber can be adjusted within certain limits independently of the exhaust gas recirculation rate via the adjustable exhaust gas cooling. Thus both the mixture ratio and the energy level in the combustion chamber can be set to their optimum values.

The inventive system is advantageously further developed by the exhaust gas cooler being arranged in a separate heat exchanger circuit. The heat exchanger cooler can thus operate autonomously without being influenced by other components of the motor vehicle. Likewise other components of the cooling system of the vehicle are not influenced by the exhaust gas cooler. The autonomous cooling circuit then comprises a separate cooler and a separate coolant pump.

It can however also be useful for the exhaust gas cooler to be arranged in the engine coolant circuit. In this way components of the engine coolant circuit can be used for exhaust gas cooling, so that overall an efficient system is implemented.

Similarly there can be provision for the exhaust gas cooler to be disposed as an engine oil or transmission oil heat exchanger respectively. Existing components of the vehicle can also be used by this.

The invention is developed in a particularly advantageous way by the process values or the values determined using a technical model being assigned to at least one of the following variables:

Exhaust gas temperature,
Recirculated exhaust gas mass or quantity respectively,
Air/fuel temperature,
Air/fuel mass or quantity respectively,
Induction gas temperature,
Induction gas mass or quantity respectively,
Coolant temperature or oil temperature of the coolant or oil flowing through the exhaust gas cooler and
Coolant mass or oil mass or coolant quantity or oil quality of the coolant flowing through the exhaust gas cooler.

If the term "quantity" is used below, this can also mean a "mass" and vice versa. The current exhaust gas temperature and the recirculated exhaust gas quantity are known in modern engine controls as engine operation variables. They can either be calculated on the basis of technical models or measured directly via corresponding sensors. The same applies to the air/fuel quality and the air/fuel temperature. The coolant temperatures and the oil temperatures are also known. If the quantity of coolant or quantity of oil respectively flowing through the exhaust gas heat exchanger are further known, with a knowledge of the heat exchanger characteristics the exhaust gas temperature at the heat exchanger outlet and thereby the mixture temperature of the induction air can be determined.

It has proved especially useful for a temperature sensor to record the air/fuel temperature, a temperature sensor to record the exhaust gas temperature at the engine exhaust, an air mass or quantity measurement device respectively to record the air/fuel mass or quantity and an exhaust gas mass or quantity measuring device to record the exhaust gas mass or quantity to be provided. From these variables, with a knowledge of specific models or specific characteristics respectively the significant variables for reliable regulation of the induction gas temperature can be determined.

Thus the system is usefully further developed by the induction gas temperature being calculated in accordance with the equation $$T_{ASG} = \dot{m}_{FG} C_{p,FG} + \dot{m}_{AG} C_{p,AG}$$

with
$\dot{m}_{FG}$: Air/fuel mass flow
$\dot{m}_{AG}$ Exhaust gas mass flow
$T_{FG}$: Air/fuel temperature
$T_{AG}$: Exhaust gas temperature
$T_{ASG}$ Induction gas temperature
$c_{p,FG}$: Heat capacity of the air/fuel mixture
$C_{p,AG}$: Heat capacity of the exhaust gas.

The induction gas temperature can thus be determined with a knowledge of measured, known variables or also variables calculated from technical models.

In this connection it is useful for the exhaust gas temperature at the heat exchanger output to be calculated using the following equation system:

$$|\Delta \dot{Q}_{KM}| = |\Delta \dot{Q}_{AG}| = \dot{Q}_{WT}$$

$$\Delta \dot{Q}_{KM} = \dot{m}_{KM} C_{p,KM} (T_{KM,OUT} - T_{KM,IN})$$

$$\Delta \dot{Q}_{AG} = \dot{m}_{AG} C_{p,AG} (T_{AG,IN} - T_{AG,OUT})$$

$$\dot{Q}_{WT} = kA\Delta T_m$$

with $\dot{Q}$: Heat flow
KM: Coolant
AG: Exhaust gas
WT: Heat exchanger
$C_p$: Heat capacity
k: Heat transfer coefficient of the heat exchanger
A: Heating surface of the heat exchanger
$\Delta T_m$ Mean logarithmic temperature difference.

From the knowledge of the characteristics of the heat exchanger, meaning especially in the knowledge of the parameters k and A, taking into account the mean logarithmic temperature difference $\Delta T_m$, the heat flow $\dot{Q}_{WT}$ present in the heat exchanger can be calculated. From this, in the knowledge of mass flows, heat capacities and further temperatures, the exhaust gas temperature at the heat exchanger output $T_{AG,OUT}$ is produced.

The invention builds on the generic method in that the temperature increase of the fresh air from $T_1$ to $T_2$ is explicitly used to influence the temperature level and thereby the energy level in the combustion chamber. In this way the advantages and special features of the inventive system are also implemented within the framework of a method. This also applies to the especially preferred embodiments of the inventive method specified hereafter.

The method is further developed in an especially advantageous manner by exhaust gas from an earlier combustion cycle being fed into fresh air or into a mixture featuring fresh air respectively, in order to provide, after fuel has been injected, an air/fuel/exhaust gas mixture with an energy level advantageous for combustion.

The method stands out as being particularly advantageous if the compression is performed by an exhaust gas turbocharger.

Equally the method is useful if the compression is performed by a compressor.

Usefully there is furthermore provision for the expansion to be performed on a throttle valve.

The method is further developed in an especially advantageous manner by the temperature $T_2$ being recorded after the expansion, so that this can then be taken into account within the framework of regulating the induction gas temperature.

In an especially preferred embodiment of the inventive method there is provision for exhaust gas to be cooled in a heat exchanger operating as an exhaust gas cooler to lower the temperature of the recirculated exhaust gas for the induction gas temperature to bet set or regulated through influencing of the coolant throughflow through the exhaust gas cooler by means of a coolant setting valve, taking into account measured values or values determined from technical models.

It is especially advantageous for the process values or the values determined from technical models to be assigned to at least one of the following variables:
Exhaust gas temperature,
Recirculated exhaust gas mass or quantity respectively,
Air/fuel temperature,
Air/fuel mass or quantity respectively,
Induction gas temperature,
Induction gas mass or quantity respectively,
Coolant temperature or oil temperature of the coolant or oil flowing through the exhaust gas cooler and
Coolant mass or oil mass or coolant quantity or oil quantity of the coolant or oil respectively flowing through the exhaust gas cooler.

It has proved to be especially useful for the air/fuel temperature, the exhaust gas temperature at the engine outlet, the air/fuel mass or quantity respectively and the exhaust gas mass or quantity respectively to be measured.

The method is further developed in a useful manner by the induction gas temperature being calculated according to the equation $$T_{ASG} = \dot{m}_{FG} C_{p,FG} + \dot{m}_{AG} C_{p,AG}$$

with
$\dot{m}_{FG}$: Air/fuel mass flow
$\dot{m}_{AG}$ Exhaust gas mass flow
$T_{FG}$: Air/fuel temperature
$T_{AG}$: Exhaust gas temperature
$T_{ASG}$ Induction gas temperature
$c_{p,FG}$: Heat capacity of the air/fuel mixture
$C_{p,AG}$: Heat capacity of the exhaust gas.

In this connection it is useful for the exhaust gas temperature at the heat exchanger output to be calculated using the following equation system:

$$|\Delta \dot{Q}_{KM}| = |\Delta \dot{Q}_{AG}| = \dot{Q}_{WT}$$

$$\Delta \dot{Q}_{KM} = \dot{m}_{KM} C_{p,KM} (T_{KM,OUT} - T_{KM,IN})$$

$$\Delta \dot{Q}_{AG} = \dot{m}_{AG} C_{p,AG} (T_{AG,IN} - T_{AG,OUT})$$

$$\dot{Q}_{WT} = kA \Delta T_m$$

with
$\dot{Q}$: Heat flow
KM: Coolant
AG: Exhaust gas
WT: Heat exchanger
$C_p$: Heat capacity
k: Heat transfer coefficient of the heat exchanger
A: Heating surface of the heat exchanger
$\Delta T_m$ Mean logarithmic temperature difference.

The invention is based on the knowledge that, by explicitly influencing or explicitly taking into account the air/fuel temperature, very fine and precise control can be exerted on the energy level in the combustion chamber of the internal combustion engine. As well as the principle of exhaust gas recirculation, this makes a further available a further independent instrument for influencing the temperature level and thereby for combustion process control. The invention in particular offers the advantage that, starting from cold-start conditions, under which HCCI operation is not possible because the temperature level is too low, the air/fuel mixture is heated up and thus an earlier switchover into the lower-emission HCCI mode is possible. In an especially preferred embodiment it is especially useful that the controlled setting of the exhaust gas temperature by means of exhaust gas cooling, in addition to the exhaust gas recirculation rate and the principle of compression and expansion, makes available a further independent adjustment variable to influence the temperature level and thereby the energy level in the combustion chamber and thereby an additional means of controlling the combustion process. The influence of the process is exerted in respect of the ignition point of the compressed air/fuel/exhaust gas mixture and the resulting variables produced from it, such as pressure curve and combustion, peak pressure, 50% mass fraction burnt point and speed of combustion. These variables in their turn are decisively responsible for the overall engine behavior in respect of its efficiency, emissions, ride disturbance and acoustics. The invention ties in with the fact that in modern engine management systems all the relevant information and operating variables, for example temperatures and masses of materials or quantities, which are needed for control of the HCCI combustion process by means of exhaust gas temperature regulation are already available. The invention can also be effectively used to allow for changed environmental or operating conditions in combustion engines, as for example is the case for engine hot running or in summer/winter mode at greatly differing ambient temperatures.

BRIEF DESCRIPTION OF THE DRAWINGS

The invention is now explained with reference to the accompanying drawings on the basis of preferred embodiments.

The figures show.

DETAILED DESCRIPTION OF THE INVENTION

Figure 1:
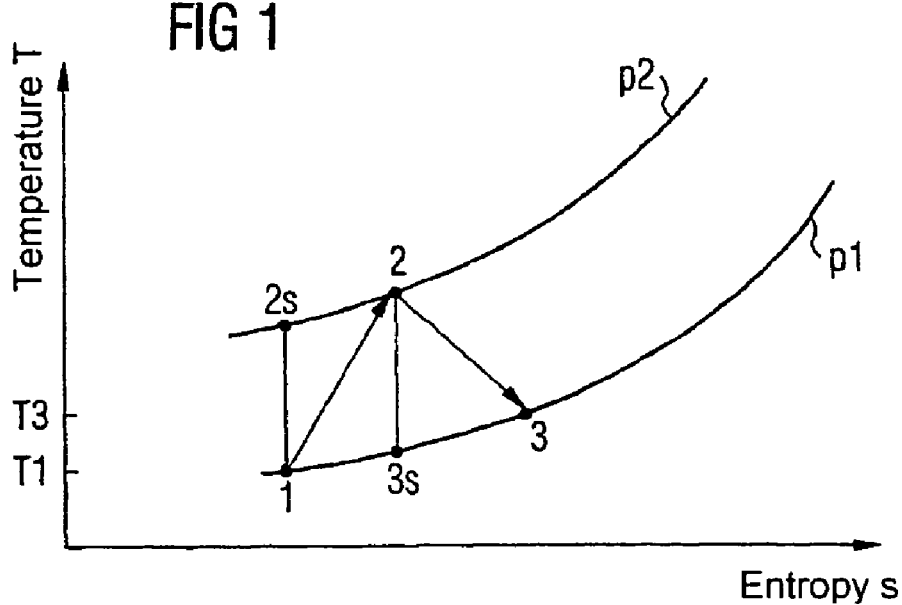
FIG. 1 a temperature-entropy diagram to explain the basic thermodynamic principles in a preferred embodiment of the present invention.

FIG. 1 shows a temperature-entropy diagram to explain the basic thermodynamic principles of a preferred embodiment of the present invention. The diagram shows the temperature-entropy graphs in a gas for two different pressures p1 and $p_2$. If a gas is compressed, starting from a pressure $p_1$ and temperature $T_1$, to the pressure $p_2$, this process does not run along an isentrope (process 1-2s), but under entropy increase (process 1-2). If an expansion occurs after the compression, meaning that the pressure falls, this does not occur along an isentrope (process 2-3s), but likewise under an increase of entropy (process 2-3). The processes for increasing pressure from p1 to $p_2$ shown here and the subsequent expansion to the output level $p_1$ represent a special case. An expansion to any other pressure level also occurs under an increase in entropy. Finally the gas, after compression from of $p_1$ to $p_2$ and expansion from $p_2$ to $p_1$, has a higher temperature level than before the compression; The temperature has increased from T1 to T3. The desired temperature change can thus be set for an internal combustion engine via the degree of compression and the subsequent expansion, for example on the throttle valve.

Figure 2:
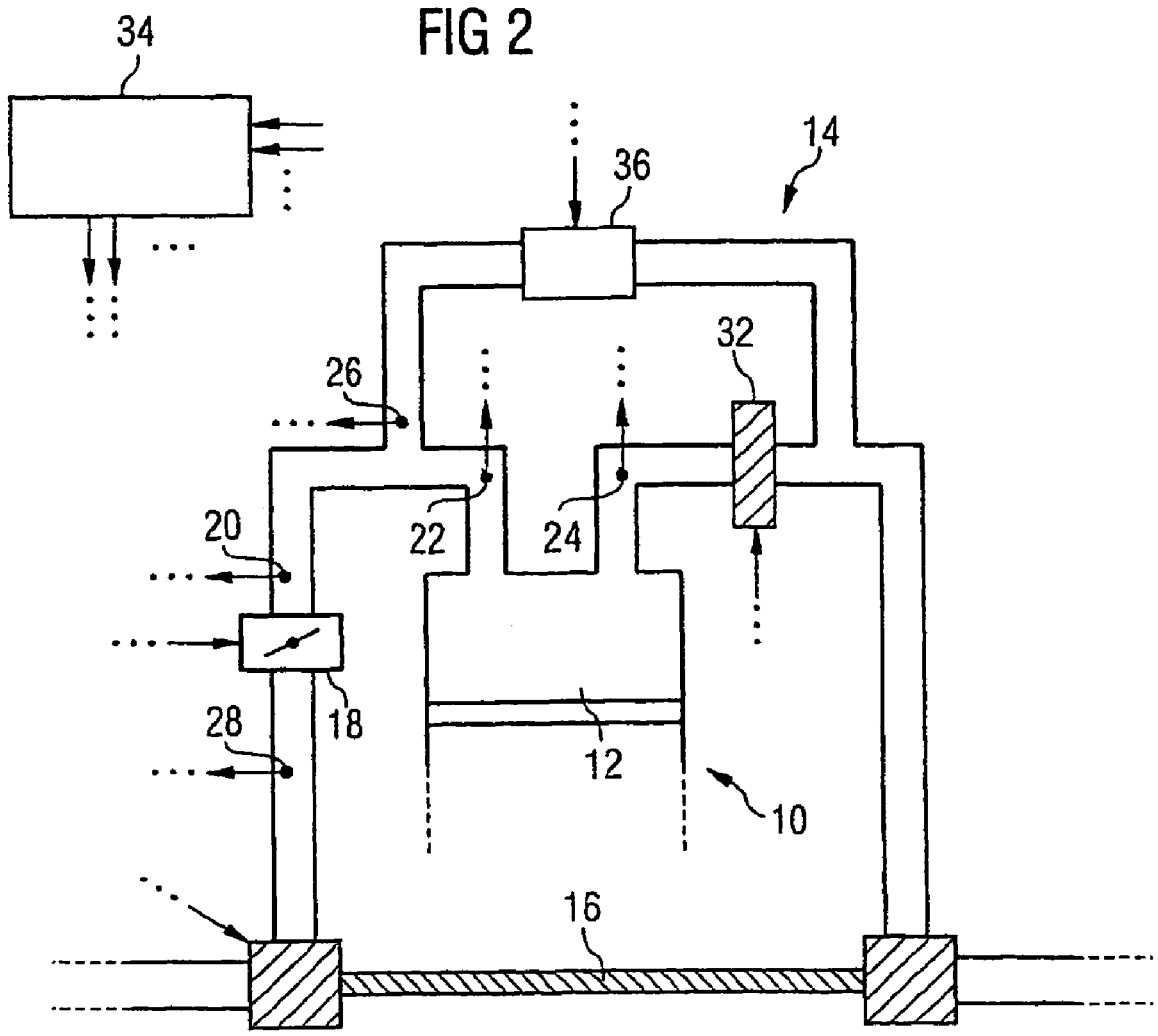
FIG. 2 a schematic diagram of a preferred embodiment of an inventive system.

FIG. 2 shows a schematic diagram of a preferred embodiment of an inventive system. It shows an internal combustion engine 10 with an exhaust gas recirculation device 14 and exhaust gas turbocharger 16. A throttle valve 18 is arranged in the inlet of the internal combustion engine 10. The exhaust train of the internal combustion engine 10 is equipped with an exhaust gas cooler 32. The particular features of the exhaust gas cooler 32 are not entered into within the context of the present diagram shown in FIG. 2. An exhaust gas recirculation valve 36 is provided in the exhaust gas recirculation system 14. The system further comprises at different points measuring devices or sensors 20, 22, 24, 26, 28, 30 respectively, of which the output signals can be fed to a control/computation unit 34. In detail the following are provided: An air mass measurement device 28, a temperature sensor 20, which is arranged in the direction of flow of the fresh air current upstream from the throttle valve 18 to record the fresh air temperature, a temperature sensor 22 to record the temperature of the induction gas before it flows into the combustion chamber 12 of the internal combustion engine 10, an exhaust gas temperature sensor 24 as well as a temperature sensor 26 for recording the temperature at the air/exhaust gas mixture point. These sensors do not absolutely have to be present to implement the present invention. For example the temperature sensor 26 can be left out if the induction gas temperature is determined in accordance with the calculations explained in conjunction with FIG. 3. Output signals of these measuring devices and sensors 20, 22, 24, 26, 28 can be fed to the control/regulation/computation device, which in its turn can activate components of the system, such as for example the exhaust gas recirculation valve 36, the exhaust gas cooler 32, the throttle valve 18 and the exhaust gas turbocharger 16. The function of these components can thus be influenced and in the final analysis can contribute to the desired energy level in the combustion chamber 12 of the internal combustion engine 10.

The system shown in FIG. 2 operates as follows. Fresh air is sucked in and compressed by the exhaust gas turbocharger 16 which is driven by the exhaust gas flow. This compressed air must pass the throttle valve 18 so that it comes to be expanded. On the basis of the thermodynamic principles shown in conjunction with FIG. 1 the air behind the throttle valve 18 has a higher temperature than the originally induced fresh air. The air reaches the combustion chamber 12 of the internal combustion engine 10. After combustion the exhaust gas is expelled, to be cooled in an exhaust gas cooler 32. Part of the cooled exhaust gas is emitted via the exhaust train. Part of the cooled exhaust gas 32 is recirculated via exhaust gas recirculation system 14 and especially the exhaust gas recirculation valve 36 to the inlet side of the internal combustion engine 10. On the basis of the signal recorded in the measuring devices and sensors 20, 22, 24, 26, 28 the control/regulation/computation unit 34 can influence the system so that in the final analysis the energy level suitable for the HCCI operation is available in the combustion chamber 12 of the internal combustion engine 10. A significant part of the exhaust gas temperature regulation is described in conjunction with FIG. 4.

Figure 3:
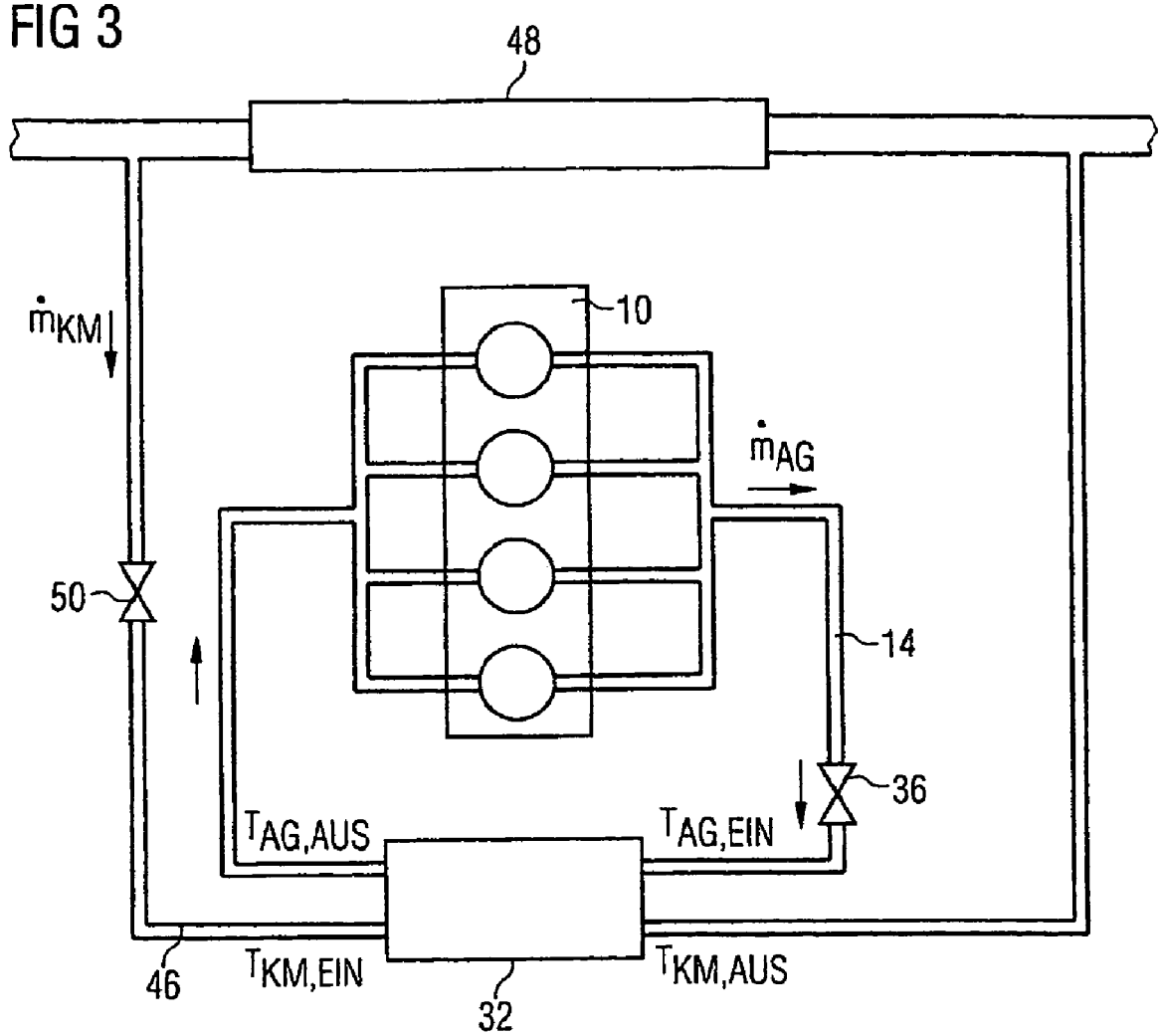
FIG. 3 a schematic diagram of an inventive system.

FIG. 3 shows a schematic diagram of an inventive system, with the especially preferred embodiment with exhaust gas cooler being specifically examined here. An internal combustion engine 10 with an external exhaust gas recirculation device 14 is shown. The exhaust gas recirculation device 14 comprises an exhaust gas recirculation valve 36 via which the exhaust gas recirculation rate can be set. The exhaust gas recirculation device 14 further comprises a heat exchanger 32 operating as an exhaust gas cooler. Furthermore a coolant flows through the exhaust gas heat exchanger 32 via a coolant system 46. A cooler 48 is provided to cool the coolant. In the present example the exhaust gas heat exchanger circuit is arranged as a parallel circuit. However numerous other exhaust gas cooler variants are conceivable, in which case the cooler 48 can be arranged as a separate cooler; It is also conceivable to use the cooler for engine cooling as well. Cooling can also be performed by the engine or transmission oil.

The coolant system 46 furthermore includes a coolant setting valve 50, via which the coolant quantity which flows through the exhaust gas cooler 32 can be set.

The system shown operates as follows. Exhaust gas emerging from the internal combustion engine 10 is partly recirculated via the exhaust gas recirculation device 14 to the inlet side of the internal combustion engine 10. In this case the exhaust gas mass flow $m_{AG}$ can be set by means of the exhaust gas recirculation valve 36. At the input of the exhaust gas cooler 32 the exhaust gas has a temperature $T_{AG,IN}$, and at the output of the exhaust gas cooler 32 the exhaust gas has a temperature $T_{AG,OUT}$, which is generally less than the temperature at the input. The cooling effect of the exhaust gas cooler 32 can be set by setting the coolant mass flow $m_{KM}$ via the coolant setting valve 50. At the input of the exhaust gas cooler 32 the temperature has the temperature $T_{KM,IN}$ and at the output of the exhaust gas cooler 32 the temperature $T_{KM,OUT}$, with the latter generally being higher than the temperature at the input. The coolant is then cooled in the cooler 48. The influencing of the throughflow of coolant through the exhaust gas cooler 32 by the coolant setting valve 50 can thus, taking into account measured values or values determined on the basis of technical models, be used to either set or regulate the induction gas temperature of exhaust gas flowing into the internal combustion engine 10.

The exhaust gas temperature $T_{AG,OUT}$ at the output of the exhaust gas cooler 32 can in this case for example be calculated using the following equation system:

$$|\Delta \dot{Q}_{KM}| = |\Delta \dot{Q}_{AG}| = \dot{Q}_{WT}$$

$$\Delta \dot{Q}_{KM} = \dot{m}_{KM} C_{p,KM} (T_{KM,OUT} - T_{KM,IN})$$

$$\Delta \dot{Q}_{AG} = \dot{m}_{AG} C_{p,AG} (T_{AG,IN} - T_{AG,OUT})$$

$$\dot{Q}_{WT} = kA\Delta T_m$$

with
$\dot{Q}$: Heat flow
KM: Coolant
AG: Exhaust gas
WT: Heat exchanger
$C_p$: Heat capacity
k: Heat transfer coefficient of the heat exchanger
A: Heating surface of the heat exchanger
$\Delta T_m$: Mean logarithmic temperature difference.

The temperature of the induction gas, referred to hereafter as TASG, can then be determined in accordance with the following equation:

$$T_{ASG} = \dot{m}_{FG} C_{p,FG} + \dot{m}_{AG} C_{p,AG}$$

with
$\dot{m}_{FG}$: Air/fuel mass flow
$\dot{m}_{AG}$: Exhaust gas mass flow
$T_{FG}$: Air/fuel temperature
$T_{AG}$: Exhaust gas temperature
$T_{ASG}$: Induction gas temperature
$c_{p,FG}$: Heat capacity of the air/fuel mixture
$C_{p,AG}$: Heat capacity of the exhaust gas.

Figure 4:
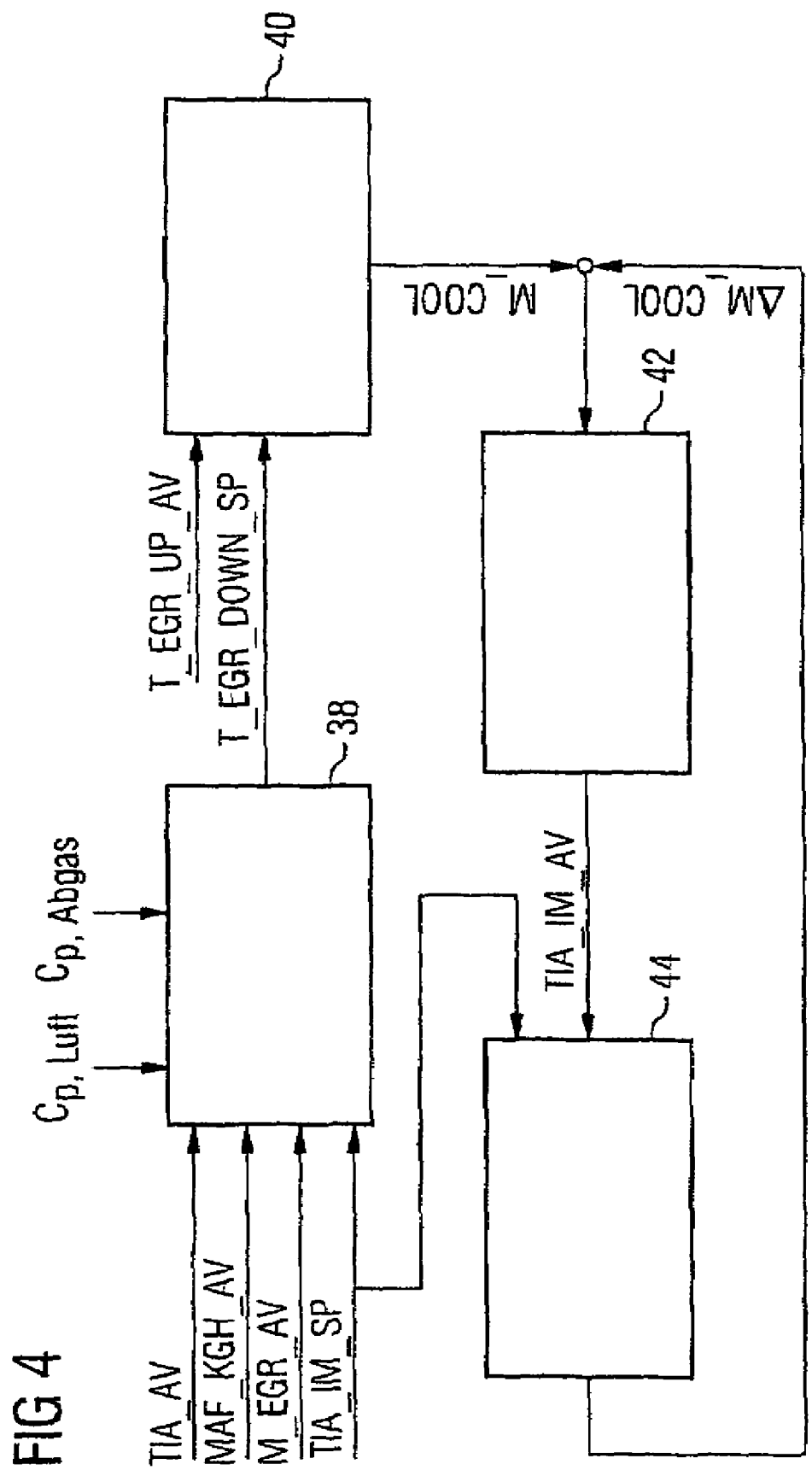
FIG. 4 a functional block diagram to explain the induction gas temperature regulation within the context of a method in accordance with the invention.

FIG. 4 shows a functional block diagram to explain the induction gas temperature regulation within the context of a method in accordance with the invention. The functional units shown can be components of the control/regulation/computation device shown in FIG. 1. The device 38 is provided for calculating the required exhaust gas temperature. This is connected to a device 40 for calculating the coolant throughflow of the exhaust gas cooler 32 shown in FIG. 1. The device 40 to calculate the coolant throughflow is in its turn connected over a regulation path 42 to a controller 44. Furthermore signals are shown in FIG. 2, with signals ending with the letters AV identifying actual values, whereas signals ending with the letters SP identify setpoint values.

The induction gas temperature regulation in accordance with FIG. 4 operates as follows. In accordance with engine operating conditions a setpoint value for the temperature of the induced air in the induction manifold (TIA_IM_SP) is specified. This is fed, together with the actual air/fuel temperature (TIA_AV) and the mass of the air/fuel fed in (MAF_KGH_AV) as well as the recycled exhaust gas (M_EGR_AV) to device 38 to calculate the required exhaust temperature. Taking into account the specific heat capacities of the fresh air ($C_{p, air}$) fed in and of the exhaust gas ($c_{p, exhaust gas}$) this device calculates the exhaust gas temperature at the mixing point (T_EGR_DOWN_SP) which is required to obtain the desired induction gas temperature in the inlet manifold. In the device 40 for calculating the coolant throughflow the setpoint value determined by the device 38 for calculating the required exhaust gas temperature (T_EGR_DOWN_SP) is compared to the actual exhaust gas temperature at the engine outlet (T_EGR_UP_AV) before the exhaust gas cooler. From the difference a coolant throughflow (M_COOL) through the exhaust gas cooler is determined which is required to obtain the desired exhaust gas temperature at the mixing point (T_EGR_DOWN_SP). This coolant flow is then implemented by a corresponding activation of an electrical coolant pump, with other types of throughflow regulation being just as easily possible. The coolant throughflow is converted in accordance with the control specified here via the regulation path 42 into a specific induction gas temperature in the inlet manifold (TIA_IM_AV) with this being present after an initial settling-down phase. This induction gas temperature in the inlet manifold (TIA_IM AV) is compared with the setpoint value (TIA_IM_SP) in the controller 44. If the values differ from each other, the coolant throughflow through the exhaust gas cooler is corrected by a value (AM_COOL), so that finally via a suitable exhaust gas temperature at the mixing point (T_EGR_DOWN_AV) the desired induction air temperature (TIA_IM_SP) is set in accordance with the setpoint.

To place the regulation explained in conjunction with FIG. 4 into a better context with the system shown in FIG. 2 shown, details are given below of where the values used for the regulation are to be measured or set respectively. The air mass measurement device 28 determines the value MAF_KGH_AV. The recirculated exhaust gas component M_EGR_AV is known in the context of the exhaust gas recirculation through corresponding activation of the exhaust gas recirculation valve 36. The air/fuel temperature TIA_AV is measured by the temperature sensor 20 beyond the throttle valve 18. The induction gas temperature TIA_IM_AV is recorded by the temperature sensor 22 before it enters the combustion chamber 12 of the internal combustion engine 10. The temperature sensor 24 at the outlet from the combustion chamber 12 of the internal combustion engine 10 records the exhaust gas temperature T_EGR_UP_AV. In additional the temperature TIA_EGR_DOWN_AV at the mixing point can be recorded by the temperature sensor 26, in which case this is however not absolutely necessary for the regulation described in conjunction with FIG. 4.

Thus the invention can be summarized as follows: With a HCCI-enabled internal combustion engine, which is preferably equipped with an exhaust gas recirculation device 14, a system and a method is proposed on the basis of which the setting of the temperature level in the combustion chamber can be improved. As well as setting the temperature via the exhaust gas recirculation device 14 the temperature is influenced independently of this as a result of the compression of the induced fresh air by the exhaust gas turbocharger 16, with, even after the expansion of the compressed air on a throttle valve 18, a temperature increase being retained, which in the final analysis can be used to influence the energy content of the combustion chamber 12.

The features of the invention disclosed in this description, in the drawings and in the claims, can be of importance both individually and in any combination for implementing the invention.

The invention claimed is:

1. A method for influencing an induction gas temperature of an internal combustion engine, comprising:
    compressing induced fresh air having a first temperature (T1) before compression;
    expanding the compressed induced fresh air such that the compressed and subsequently expanded fresh air has a second temperature (T2) greater than the first temperature;
    recording the second temperature (T2) after the expansion;
    recirculating exhaust gas with an exhaust gas recirculation device to combine exhaust gas from an earlier combustion cycle with the fresh air to form a mixture featuring exhaust gas and fresh air;
    cooling exhaust gas with an exhaust gas cooler, the exhaust gas cooler connected to the exhaust gas recirculation device to influence the temperature of the exhaust gas by controlling the heat flow within the gas exhaust gas recirculation device;

providing a control/regulation/computation device which includes a first device and a second device; and calculating a required exhaust gas temperature with the first device, the first device connected to the second device for calculating a coolant through-flow of the exhaust gas cooler, the second device is connected via a coolant flow regulation path to a coolant flow controller, wherein the calculating the required exhaust temperature is based on determining/sensing/measuring/computing measured values and set-point values of engine operating variables selected from the group consisting of: exhaust gas temperature, recirculated exhaust gas mass, recirculated exhaust gas quantity, air/fuel temperature, air/fuel mass, air/fuel quantity, induction gas temperature, induction gas mass, induction gas quantity, coolant temperature, oil temperature of the coolant, oil flowing through the exhaust gas cooler, coolant mass, oil mass, coolant quantity, oil quantity of the coolant, and oil flowing through the exhaust gas cooler, and wherein explicitly influencing the combustion chamber temperature by controlling the heat flow to the combustion chamber and thereby the energy level in the combustion chamber is based on/depends upon the determined/sensed/computed measured values, the determined/sensed/computed set-point values, the determined/sensed/computed measured values temperature increase of the fresh air from the first temperature (T1) to the second temperature (T2).

2. The method in accordance with claim 1, wherein the compressing step is performed by an exhaust gas turbocharger.

3. The method in accordance with claim 1, wherein the compressing step is performed by a compressor.

4. The method in accordance with claim 1, wherein the expanding step is performed by a throttle valve.

5. The method in accordance with claim 1, further comprising providing a coolant setting valve in the coolant flow regulation path to set the coolant mass flow.

6. The method in accordance with claim 5, further comprising the step of measuring the air/fuel temperature, the exhaust gas temperature at the engine exhaust, the air/fuel mass or quantity respectively and the exhaust gas mass or quantity respectively.

7. Method in accordance with claim 6, further comprising calculating the induction gas temperature in accordance with equation $$T_{ASG} = \frac{\dot{m}_{FG}T_{FG}C_{p,FG} + \dot{m}_{AG}T_{AG}C_{p,AG}}{\dot{m}_{FG}C_{p,FG} + \dot{m}_{AG}C_{p,AG}},$$

with
$\dot{m}_{FG}$: Air/fuel mass flow
$\dot{m}_{AG}$: Exhaust gas mass flow
$T_{FG}$: Air/fuel temperature
$T_{AG}$: Exhaust gas temperature
$T_{ASG}$: Induction gas temperature
$c_{p,FG}$: Heat capacity of the air/fuel mixture
$C_{p,AG}$: Heat capacity of the exhaust gas.

8. The method in accordance with claim 5, further comprising calculating the exhaust gas temperature at the heat exchanger outlet using the following equation system:

$|\Delta \dot{Q}_{KM}| = |\Delta \dot{Q}_{AG}| = \dot{Q}_{WT};$ $\Delta \dot{Q}_{KM} = \dot{m}_{KM} C_{p,KM}(T_{KM,OUT} - T_{KM,IN});$ $\Delta \dot{Q}_{AG} = \dot{m}_{AG} C_{p,AG}(T_{AG,IN} - T_{AG,OUT});$ $\dot{Q}_{WT} = kA\Delta T_m$ with
$\dot{Q}$: Heat flow
KM: Coolant
AG: Exhaust gas
WT: Heat exchanger
$C_p$: Heat capacity
k: Heat transfer coefficient of the heat exchanger
A: Heating surface of the heat exchanger
$\Delta T_m$ Mean logarithmic temperature difference.

9. A system for influencing an induction gas temperature in a combustion chamber of an internal combustion engine, comprising:

a compression device to compress induced fresh air, the fresh air having a first temperature (T1) before compression;

an expansion device that causes an expansion of the compressed induced fresh air, with the compressed and subsequently expanded fresh air having a second temperature (T2) greater than the first temperature (T1);

a temperature sensor to record the second temperature (T2) that is arranged in the direction of flow of the fuel/air with reference to the expansion device; and an exhaust gas recirculation device to combine exhaust gas from an earlier combustion cycle with the fresh air to form a mixture featuring exhaust gas and fresh air;

an exhaust gas cooler connected to the exhaust gas recirculation device to influence the temperature of the exhaust gas by controlling the heat flow within the gas exhaust gas recirculation device;

a control/regulation/computation device which includes a first device for calculating a required exhaust gas temperature, the first device connected to a second device for calculating a coolant through-flow of the exhaust gas cooler, the second device is connected via a coolant flow regulation path to a coolant flow controller;

wherein measured values and set-point values for calculating the required exhaust temperature are assigned to engine operating variables selected from the group consisting of: exhaust gas temperature, recirculated exhaust gas mass, recirculated exhaust gas quantity, air/fuel temperature, air/fuel mass, air/fuel quantity, induction gas temperature, induction gas mass, induction gas quantity, coolant temperature, oil temperature of the coolant, oil flowing through the exhaust gas cooler, coolant mass, oil mass, coolant quantity, oil quantity of the coolant, and oil flowing through the exhaust gas cooler; and wherein the control/regulation/computation device uses the measured values, set-point values, and the temperature increase of the fresh air from T1 to T2 to explicitly influence the combustion chamber temperature by controlling the heat flow to the combustion chamber and thereby the energy level in the combustion chamber.

10. The system in accordance with claim 9, wherein the compression device is an exhaust gas turbocharger.

11. The system in accordance with claim 9, wherein the compression device is a compressor.

12. The system in accordance with claim 9, wherein the expansion is performed on a throttle valve.

13. The system in accordance with claim 9, wherein a coolant setting valve is provided in the coolant flow regulation path to set the coolant mass flow.

14. The system in accordance with claim 9, wherein the exhaust gas cooler is arranged in a separate heat exchanger circuit.

15. The system in accordance with claim 9, wherein the exhaust gas cooler is arranged in an engine coolant circuit.

16. The system in accordance with claim 9, wherein the exhaust gas cooler is designed as an engine or transmission oil heat exchanger respectively.

17. The system in accordance with claim 9, wherein a temperature sensor to record the air/fuel temperature, a temperature sensor to record the exhaust gas temperature at the engine exhaust, an air mass or quantity measurement device respectively to record the air/fuel mass or quantity, and an exhaust gas mass or quantity measuring device to record the exhaust gas mass or quantity are provided.

18. The system in accordance with claim 9, wherein the induction gas temperature is calculated in accordance with equation $$T_{ASG} = \frac{\dot{m}_{FG} T_{FG} C_{p,FG} + \dot{m}_{AG} T_{AG} C_{p,AG}}{\dot{m}_{FG} C_{p,FG} + \dot{m}_{AG} C_{p,AG}}$$

with $\dot{m}_{FG}$: Air/fuel mass flow
$\dot{m}_{AG}$: Exhaust gas mass flow
$T_{FG}$: Air/fuel temperature
$T_{AG}$: Exhaust gas temperature
$T_{ASG}$: Induction gas temperature
$c_{p,FG}$: Heat capacity of the air/fuel mixture
$C_{p,AG}$: Heat capacity of the exhaust gas.

19. The system in accordance with claim 9, wherein the exhaust gas temperature at the heat exchanger outlet is calculated using the following equation system:

$$|\Delta \dot{Q}_{KM}| = |\Delta \dot{Q}_{AG}| = \dot{Q}_{WT};$$

$$\Delta \dot{Q}_{KM} = \dot{m}_{KM} C_{p,KM} (T_{KM,OUT} - T_{KM,IN});$$

$$\Delta \dot{Q}_{AG} = \dot{m}_{AG} C_{p,AG} (T_{AG,IN} - T_{AG,OUT});$$

$$\dot{Q}_{WT} = k A \Delta T_m$$

with
$\dot{Q}$: Heat flow
KM: Coolant
AG: Exhaust gas
WT: Heat exchanger
$C_p$: Heat capacity
k: Heat transfer coefficient of the heat exchanger
A: Heating surface of the heat exchanger
$\Delta T_m$ Mean logarithmic temperature difference.

* * * * *